(12) United States Patent
Tsou

(10) Patent No.: US 6,273,519 B1
(45) Date of Patent: Aug. 14, 2001

(54) OIL HUB CUP

(76) Inventor: Eric Tsou, 7F, No. 56, Lane 103, Sec. 2, Nei Hu Road, Taipei (TW)

( * ) Notice: Subject to any disclaimer, the term of this patent is extended or adjusted under 35 U.S.C. 154(b) by 0 days.

(21) Appl. No.: 09/496,809

(22) Filed: Feb. 2, 2000

(51) Int. Cl.[7] .................................................... B60B 27/00
(52) U.S. Cl. ..................................... 301/108.2; 301/108.4
(58) Field of Search ........................ 301/108.1, 108.2 I, 301/108.3, 108.4

(56) References Cited

U.S. PATENT DOCUMENTS

| | | | | |
|---|---|---|---|---|
| 2,647,406 | * | 8/1953 | Sorensen | 301/108.2 |
| 3,649,080 | * | 3/1972 | Molinare | 301/108.1 |
| 4,073,540 | * | 2/1978 | Jackowski | 301/108.2 |
| 5,024,488 | * | 6/1991 | Lindhuber et al. | 301/108.4 |
| 5,303,800 | * | 4/1994 | Persson | 301/108.3 |
| 5,482,358 | * | 1/1996 | Kuck | 301/108.3 |
| 5,492,393 | * | 2/1996 | Peisker et al. | 301/108.4 |
| 5,752,746 | * | 5/1998 | Perry | 301/108.4 |
| 5,860,708 | * | 1/1999 | Borders et al. | 301/108.4 |

\* cited by examiner

*Primary Examiner*—S. Joseph Morano
*Assistant Examiner*—Jason R. Bellinger
(74) *Attorney, Agent, or Firm*—Ostrolenk, Faber, Gerb & Soffen, LLP

(57) ABSTRACT

An oil hub cup includes a cylindrical body mounted to a wheel axle defining an interior space for preserving lubricant oil. The cylindrical body has a top face defining a central bore with a circumferential shoulder formed around the central bore for receiving and retaining an observing lens to seal the central bore. A cavity is defined in a top face of the observing lens with first and second holes defined in the observing lens exposed to a bottom of the cavity. The second hole is in communication with the interior space of cylindrical body for releasing excessive inside pressure inside the hub cup. A resilient vent check valve includes a disk received in the cavity and a plug extending from the disk for being received in the first hole to secure the vent check valve in position. A circumferential flange is formed on the disk to sealingly engage the bottom of the cavity for sealing the second hole thereby preventing water from entering the interior space of the cylindrical body through the second hole.

9 Claims, 7 Drawing Sheets

OIL HUB CUP

FIELD OF THE INVENTION

The present invention generally relates to a hub structure of a vehicle wheel axle, and in particular to an oil hub cup of a wheel axle which effectively prevent emulsification of grease or lubrication oil that is contained in the cup for lubricating the axle.

BACKGROUND OF THE INVENTION

A wheel of a vehicle is mounted to a chassis of the vehicle by an axle. To ensure smooth rotation of the wheel about the axle, lubricant, such as grease and lubrication oil, is commonly applied between the wheel hub and the axle. The lubricant is usually preserved in a cup. Two types of lubricant cups are known. One includes visual inspection means for allowing a user to visually check the amount of the lubricant in the cup and the other does not.

A major problem encountered by the lubricant of the axle is emulsification. Once emulsified, the grease or lubrication oil deteriorates and loses its function of lubrication thereby causing damage to the axle.

FIG. 1 shows a conventional oil cup indicated by reference numeral 1. The oil cup 1 comprises a casing with a vent hole 111 defined therein for pressure balance and heat dissipation purposes. The vent hole 111, however, also provides a leaking passage for water to get into the cup, especially when the vehicle is cleaned with pressurized water or when the vehicle is moving across a river. Water getting into the oil cup 1 through the vent hole 111 is mixed with and emulsifies the grease or lubrication oil contained therein.

Thus, it is desired to provide an oil cup that is capable to effectively block water from leaking into the oil cup thereby eliminating the emulsification of the oil contained therein.

SUMMARY OF THE INVENTION

Accordingly, an object of the present invention is to provide an oil hub cup which is capable to effectively prevent the entry of water thereby keeping oil contained therein from emulsification.

Another object of the present invention is to provide an oil hub cup which is capable to release excessive pressure inside the hub cup.

A further object of the present invention is to provide an oil hub cup having readily releasable water blocking means for facilitating use of the oil hub cup.

To achieve the above objects, in accordance with the present invention, there is provided an oil hub cup comprising a cylindrical body mounted to a wheel axle defining an interior space for preserving lubricant oil. The cylindrical body has a top face defining a central bore with a circumferential shoulder formed around the central bore for receiving and retaining an observing lens to seal the central bore. A cavity is defined in a top face of the observing lens with first and second holes defined in the observing lens exposed to a bottom of the cavity. The second hole is in communication with the interior space of cylindrical body for releasing excessive inside pressure inside the hub cup. A resilient vent check valve comprises a disk received in the cavity and a plug extending from the disk for being received in the first hole to secure the vent check valve in position. A circumferential flange is formed on the disk to sealingly engage the bottom of the cavity for sealing the second hole thereby preventing water from entering the interior space of the cylindrical body through the second hole.

BRIEF DESCRIPTION OF THE DRAWINGS

The present invention will be apparent to those skilled in the art by reading the following description of a preferred embodiment thereof, with ref to the accompanying drawings, in which.

DETAILED DESCRIPTION OF THE PREFERRED EMBODIMENT

Figure 1:
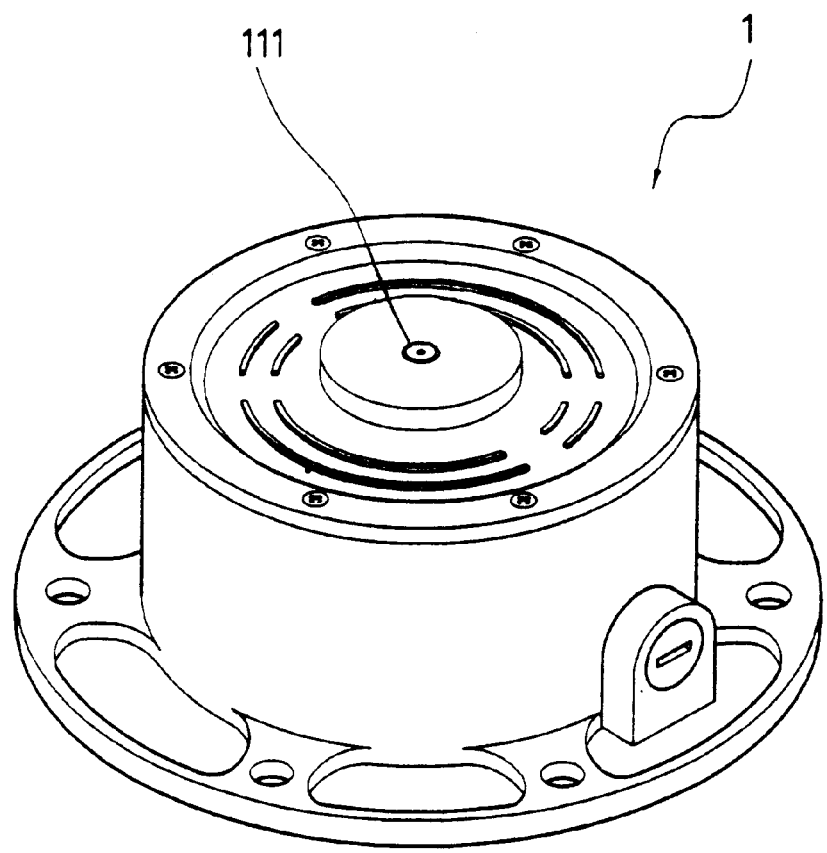
FIG. 1 is a perspective view of a conventional oil hub cup.
Figure 2:
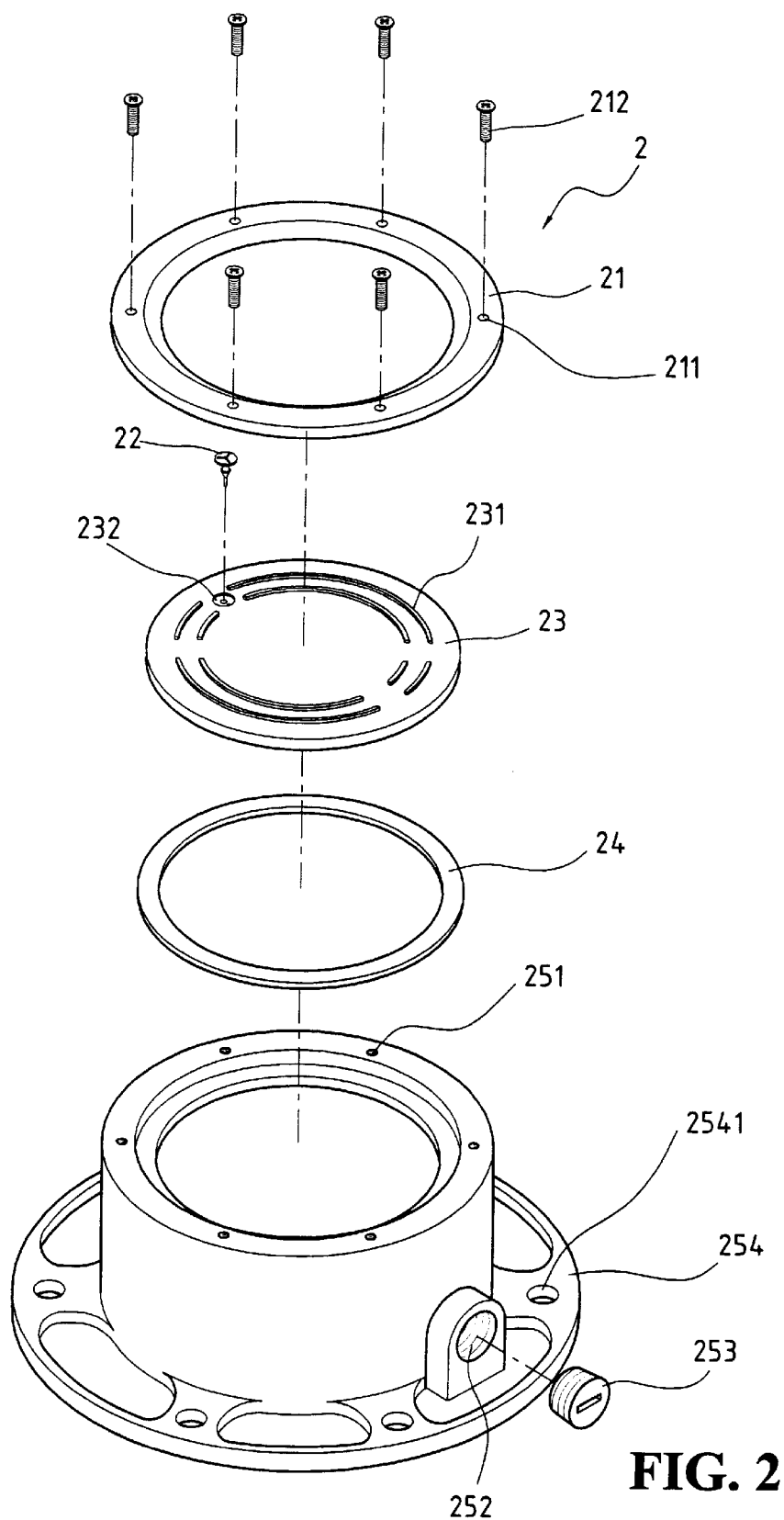
FIG. 2 is an exploded view of an oil hub cup constructed in accordance with the present invention.
Figure 3:
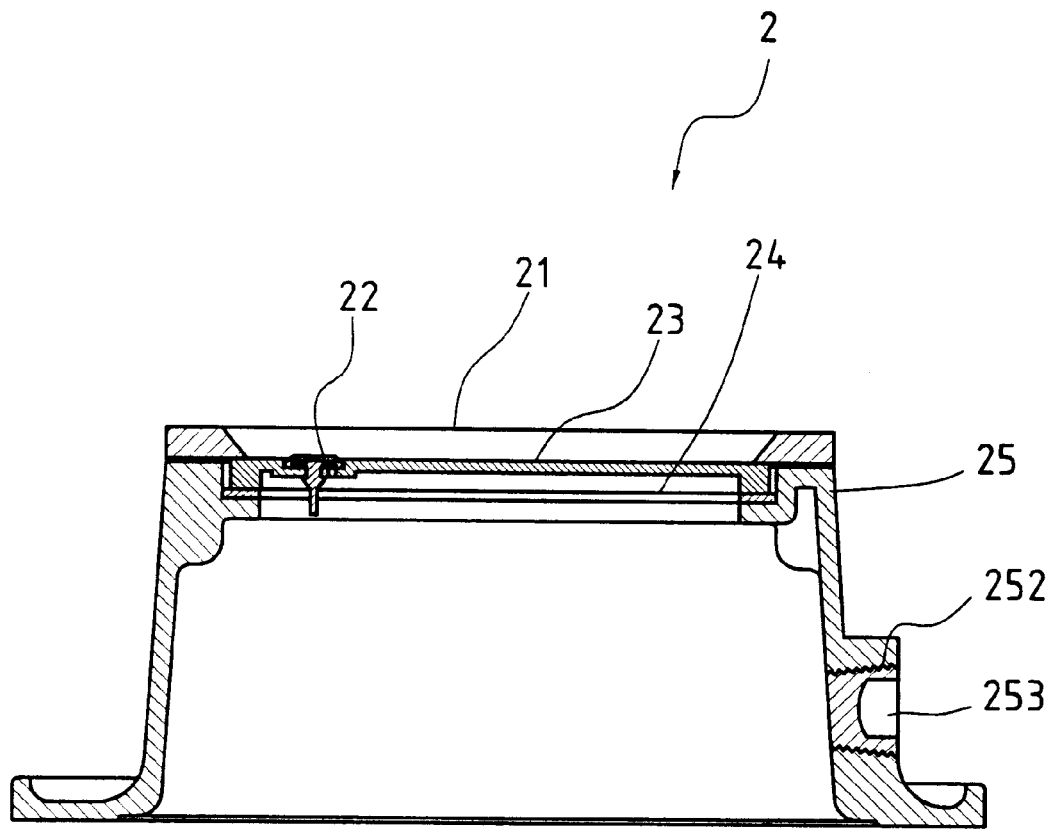
FIG. 3 is a cross-sectional view of the oil hub cup of the present invention.

With reference to the drawings and in particular to FIGS. 2 and 3, wherein an oil hub cup constructed in accordance with the present invention, generally designated with reference numeral 2, is shown, the oil hub cup 2 comprises a cylindrical body 25 defining an interior space (not labeled) for preserving grease or lubrication oil. An opening 252 is defined in the cylindrical body 25 for feeding oil into the interior space thereof A stopper 253 is releasably fit into the opening 252 for sealing the openings 252. Preferably, the opening 252 is circular and inner-threaded and the stopper 252 has threading for engaging the opening 252.

The cylindrical body 25 has a top face (not labeled) defining a central bore in communication with the interior space with an annual shoulder (not labeled) formed around the central bore. An observing lens 23 is received in the central bore and supported by the annual shoulder with a gasket 24, preferably made of rubber, interposed therebetween for sealing purposes. A top cover 21 made of a rigid material in the form of a ring is mounted to the top face of the cylindrical body 25 by means of bolts 212 received in through holes 211 defined in the top cover 21 and engaging with inner-threaded holes 251 defined in the top face of the cylindrical body 25. The top cover 21 has an inner circumference partially overlapping the observing lens 23 for fixing the lens 23 in position. Preferably, the top cover 21 is made of aluminum or an alloy thereof.

Figure 4:
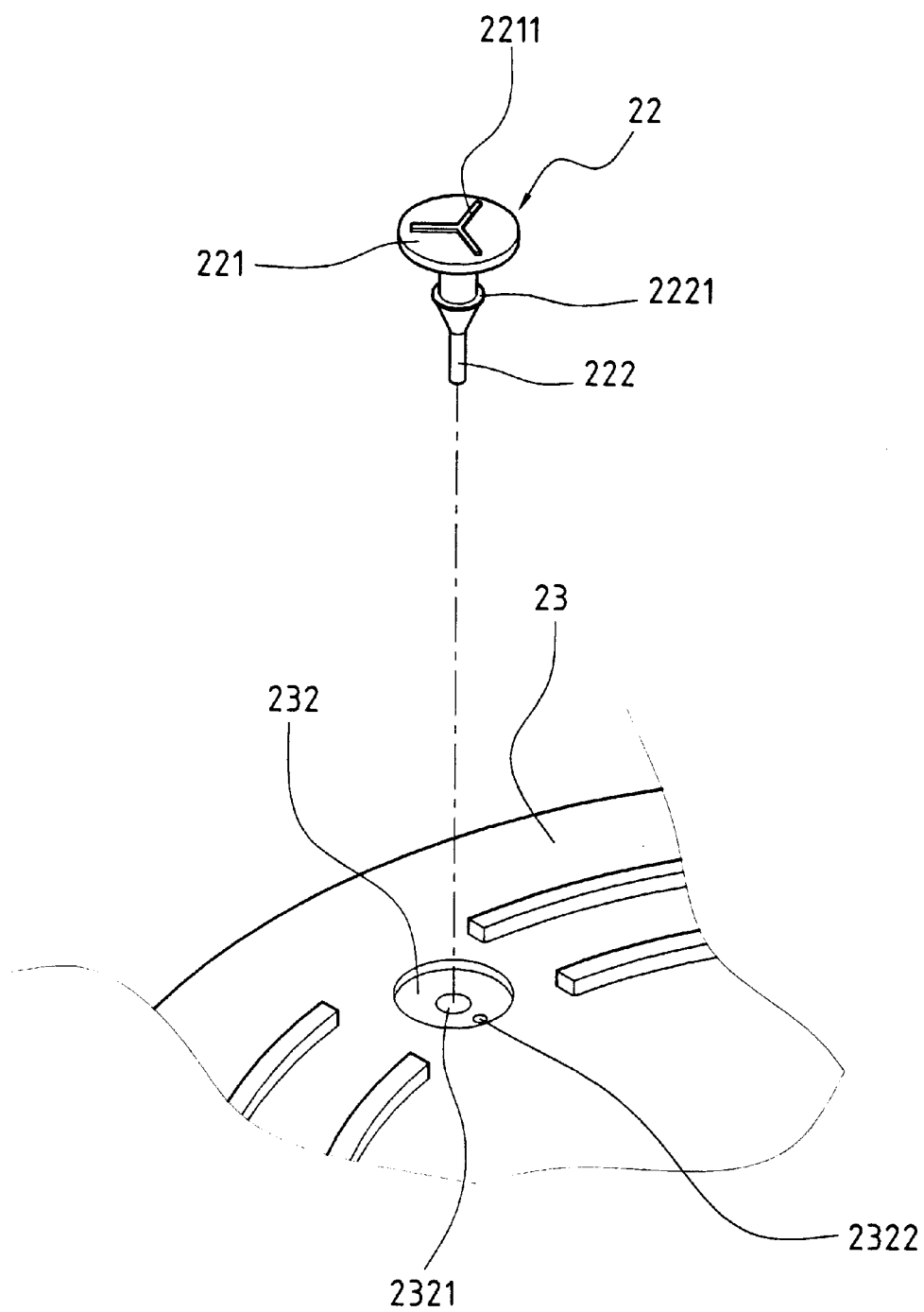
FIG. 4 is a perspective view of a vent check valve detached from the oil hub cup of the present invention.

Also referring to FIG. 4, the observing lens 23 is made transparent for user's observation of oil contained in the interior space of the cylindrical body 25. Index lines 231 for indicating quantity of the oil are formed on the observing lens 23. A cavity 232 is defined in an outside face of the observing lens 23 and a central hole 2321 extends from a bottom of cavity 232 to an inside face of the observing lens 23. A vent hole 2322 is defined in the cavity 232 in communication with the interior of the cylindrical body 25.

Figure 5:
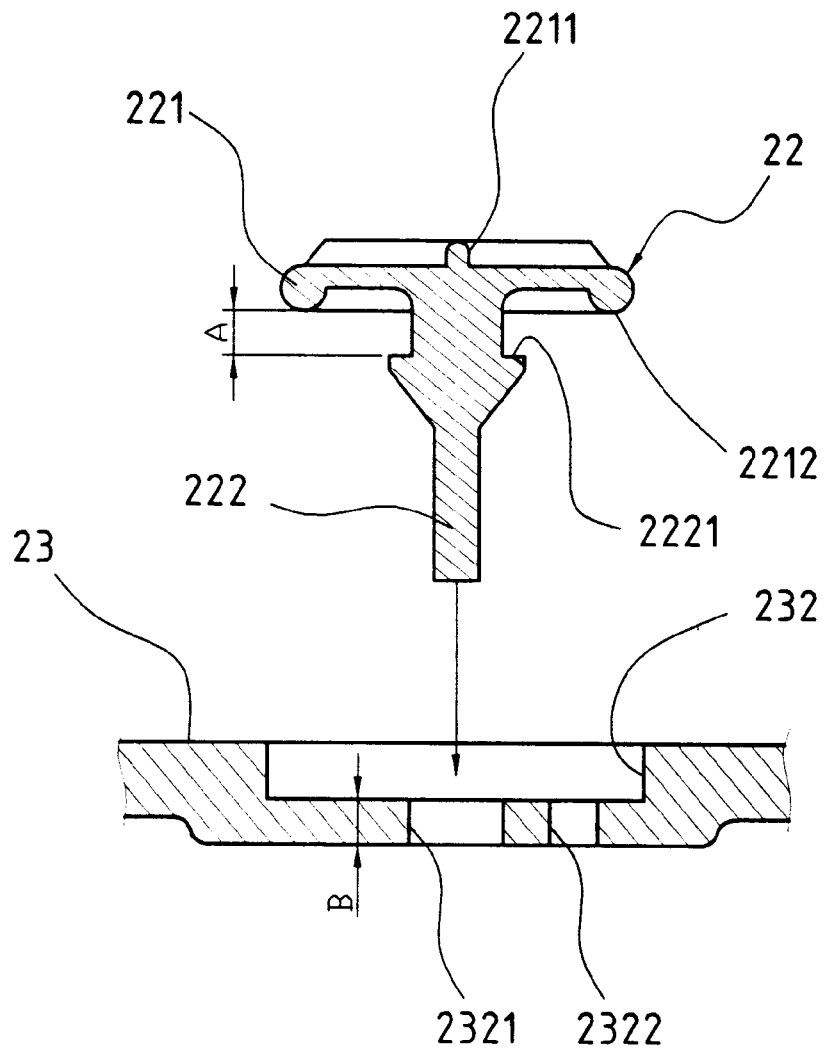
FIG. 5 is a cross-sectional view showing the vent check valve separated from the oil hub cup of the present invention.
Figure 6:
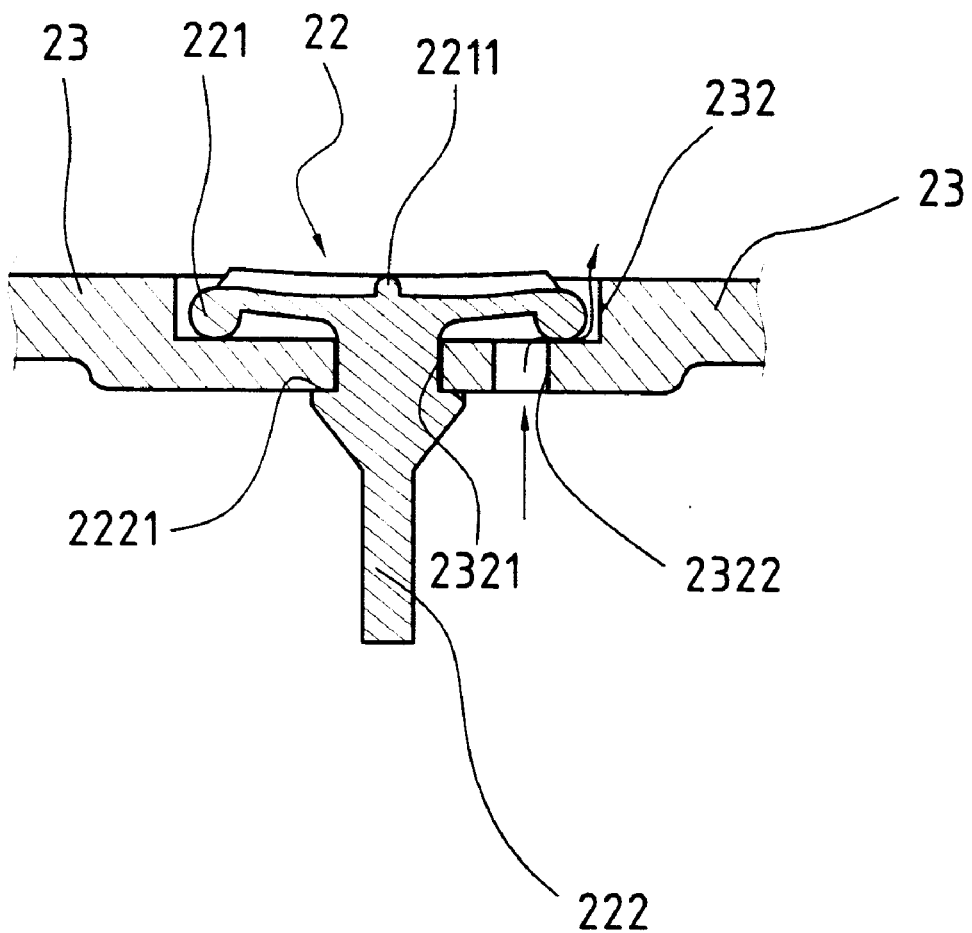
FIG. 6 is a cross-sectional view showing the vent check valve mounted to the oil hub cup of the present invention.

Further referring to FIGS. 5 and 6, a vent check valve 22 made of a resilient material, such as rubber, comprises a disk 221 receivable in the cavity 232 and a plug 222 extending from the disk 221 and received in the central hole 2321 for retaining the vent check valve 22 in the cavity 232. Reinforcing ribs 2211 are formed on a top face of the disk 221 for reinforcing the disk 221.

Preferably, a circumferential projection 2221 is formed around the plug 222 for interferentially engaging the central hole 2321 thereby securing the vent check valve 22 in the cavity 232. In the embodiment illustrated, the projection 2221 has a wedge-shaped cross section having a horizontal surface facing a bottom face of the disk 221 with a distance A therebetween substantially corresponding to or slightly smaller than a thickness B of the lens 23 between the bottom of the cavity 232 and the inside face of the observing lens 23 thereby allowing the horizontal surface of the projection 2221 to engage with a circumferential edge of the central hole 2321 on the inside face of the observing lens 23 to fix the vent check valve 22 in position.

A circumferential flange 2212 is formed on the bottom face of the disk 221 for providing a sealing engagement with the bottom of the cavity 232. The disk 221 has a size sufficient to cover the vent hole 2322 with the vent hole 2322 located inboard the flange 2212. The condition that the distance A is smaller than the thickness B results in deformation of the disk 221 when the vent check valve 22 is mounted to the lens 23 whereby a concave configuration is formed as shown in FIG. 6, leading to a force acting upon the flange 2212 for hermetically sealing against the bottom of the cavity 232 thereby effectively preventing water from leaking into the interior space of the cylindrical body 25.

When the disk 221 is subject to hydraulic pressure caused by water externally acting thereupon, the disk 221 is further deformed thereby causing the flange 2212 to more sealingly engage the bottom of the cavity 232. On the other hand, in case the oil contained in the cup 2 is vaporized thereby causing a significant increase of inside pressure of the cylindrical body 25, the inside pressure acting upon the bottom face of the disk 221 and deforming the disk 221 in a direction away from the cavity 232 thereby releasing the vapor of the oil, as indicated by arrows of FIG. 6, to reduce the inside pressure thereof until a new balance of pressure between both sides of the disk 221 is regained.

Figure 7:
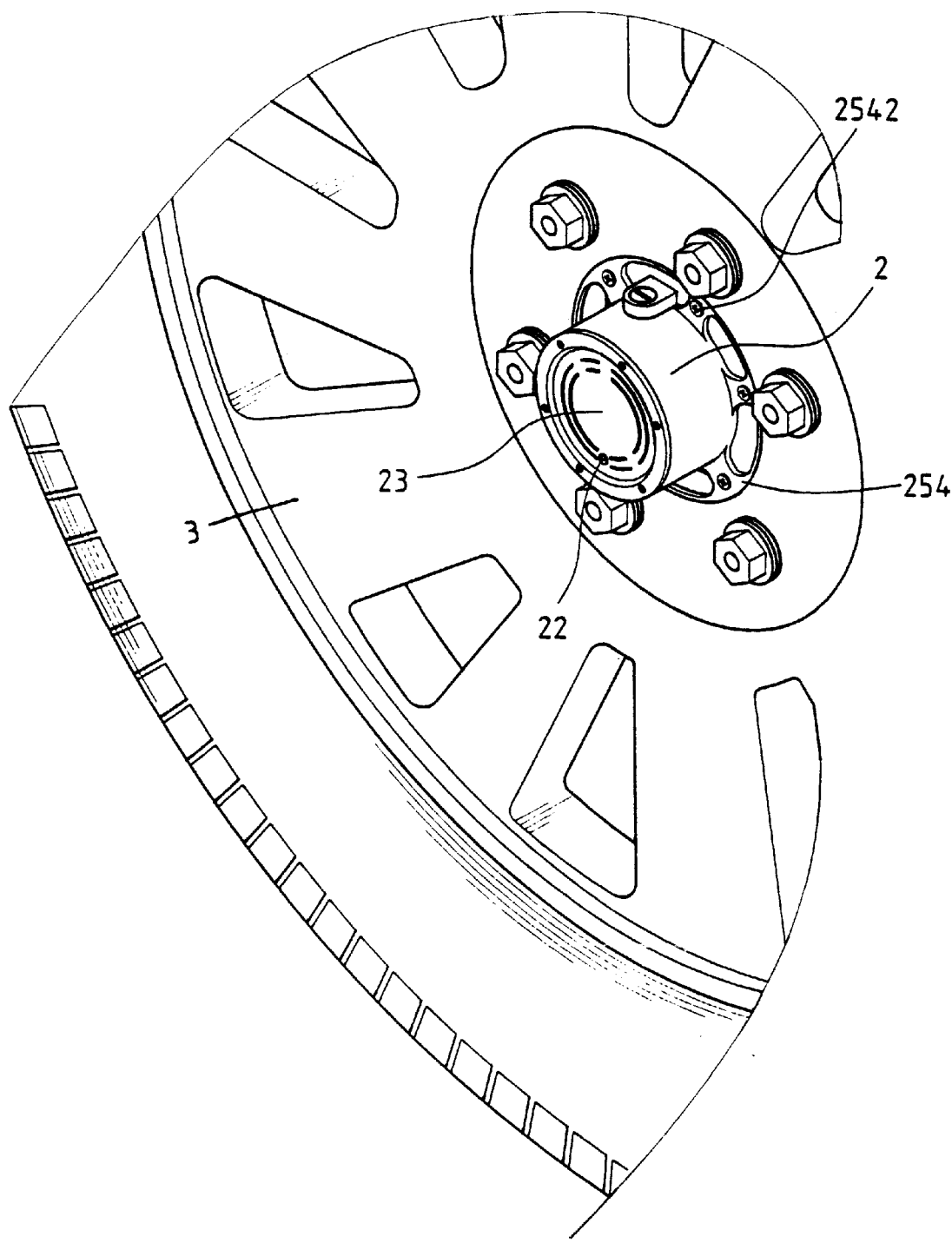
FIG. 7 is a perspective view showing the oil hub cup of the present invention mounted to a wheel

FIG. 7 shows an application of the oil hub cup 2 on a wheel 3. The cylindrical body 25 forms a circumferential flange 254 for mounting to the wheel 3. Holes 2541 are defined in the flange 254 for receiving bolts 2542 that secure the oil hub cup 2 to the wheel 3.

Although the present invention has been described with respect to the preferred embodiment, it is contemplated that a variety of modifications, variations and substitutions may be done without departing from the scope of the present invention that is intended to be defined by the appended claims.

What is claimed is:

1. An oil hub cup comprising:
   a cylindrical body defining an interior space adapted to preserve oil, the cylindrical body having a top face defining a central bore;
   an observing lens mounted to the top face of the cylindrical body for sealing the central bore with a first surface thereof facing the interior space, first and second holes being defined in an opposite second surface of the observing lens, the second hole being in communication with the interior space of cylindrical body; and
   a resilient vent check valve comprising a disk having a third surface and a plug extending from the third surface for being received and retained in the first hole of the lens, a circumferential flange being formed on the third surface to sealingly engage the second surface of the lens, the disk being sized to cover the second hole with the second hole located inboard of the flange thereby sealed by the flange.

2. The oil hub cup as claimed in claim 1, wherein a cavity having a bottom is defined in the second surface of the lens for receiving the disk of vent check valve therein the circumferential flange of the disk sealingly engaging the bottom of the cavity.

3. The oil hub cup as claimed in claim 1, wherein a projection is formed on the plug for engaging with the first surface of the lens to secure the vent check valve in position.

4. The oil hub cup as claimed in claim 3, wherein a distance between the projection and the disk is smaller than a thickness of the lens whereby the engagement of the projection with the first surface causes a concave configuration of the disk which induces a force in the circumferential flange to sealingly engage the lens.

5. The oil hub cup as claimed in claim 1, wherein a circumferential shoulder is formed around the central bore for supporting the lens thereon, a rigid ring being attached to the top face of the cylindrical body and partially overlapping the lens for retaining the lens in position.

6. The oil hub cup as claimed in claim 1, wherein reinforcing ribs are formed on a fourth surface of the disk which is opposite to the third surface.

7. The oil hub cup as claimed in claim 1, wherein a gasket is interposed between the lens and the top face of the cylindrical body.

8. The oil hub cup as claimed in claim 5, wherein a gasket is interposed between the lens and the shoulder.

9. The oil hub cup as claimed in claim 1, wherein marks are formed on the lens for indicating quantity of oil inside the cylindrical body.

* * * * *